(12) United States Patent
Nakashima et al.

(10) Patent No.: US 7,341,778 B2
(45) Date of Patent: Mar. 11, 2008

(54) RADIO WAVE-TRANSMITTING WAVELENGTH-SELECTIVE PLATE AND METHOD FOR PRODUCING SAME

(75) Inventors: Hiroshi Nakashima, Matsusaka (JP); Masaaki Yonekura, Matsusaka (JP); Hideo Omoto, Matsusaka (JP); Motoh Asakura, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 10/552,615

(22) PCT Filed: Mar. 12, 2004

(86) PCT No.: PCT/JP2004/003284

§ 371 (c)(1),
(2), (4) Date: Oct. 6, 2005

(87) PCT Pub. No.: WO2004/091904

PCT Pub. Date: Oct. 28, 2004

(65) Prior Publication Data

US 2006/0286387 A1    Dec. 21, 2006

(30) Foreign Application Priority Data

Apr. 11, 2003   (JP)   ............................. 2003-107752

(51) Int. Cl.
*B32B 5/16* (2006.01)

(52) U.S. Cl. ...................... 428/332; 428/323; 428/402; 427/372.2; 427/376.7; 501/904

(58) Field of Classification Search ................ 428/332, 428/323, 402; 427/372.2, 376.7; 501/904
See application file for complete search history.

(56) References Cited

U.S. PATENT DOCUMENTS

| | | | |
|---|---|---|---|
| 2,861,896 A | * | 11/1958 | Kraus .......................... 428/433 |
| 2002/0140885 A1 | | 10/2002 | Ueno |
| 2002/0142149 A1 | | 10/2002 | Nakashima et al. |
| 2002/0197459 A1 | | 12/2002 | Maurer et al. |
| 2003/0039842 A1 | | 2/2003 | Nakashima et al. |
| 2004/0067339 A1 | * | 4/2004 | Gandon et al. ............. 428/141 |

FOREIGN PATENT DOCUMENTS

JP    6-40752    2/1994

(Continued)

OTHER PUBLICATIONS

Smallman, R.E.; Bishop, R.J. (1999). Modern Physical Metallurgy and Materials Engineering—Science, Process, Applications (6th Edition),pp. 345 through 348.*

(Continued)

*Primary Examiner*—Carol Chaney
*Assistant Examiner*—Elizabeth Robinson
(74) *Attorney, Agent, or Firm*—Crowell & Moring LLP

(57) ABSTRACT

The present invention relates to a radio wave-transmitting, wavelength-selective plate, which is characterized in that a layer composed of Ag fine particles is formed and that the central portions of the Ag fine particles contain an alloy (Ag alloy) formed of Ag and a metal which forms a homogeneous solid solution with Ag (hereinafter referred to as a homogeneous solid solution metal).

13 Claims, 1 Drawing Sheet

FOREIGN PATENT DOCUMENTS

| | | |
|---|---|---|
| JP | 2620456 | 3/1997 |
| JP | 2000-281388 | 10/2000 |
| JP | 2001-226765 | 8/2001 |
| JP | 2003-509716 | 3/2003 |
| WO | WO0202472 A1 * | 1/2002 |

OTHER PUBLICATIONS

ASM Handbook, vol. 3, Phase Diagrams for Silver -Zinc alloy, Silver-Gold Alloy, and Silver-Palladium Alloy (2002).*

* cited by examiner

US 7,341,778 B2

RADIO WAVE-TRANSMITTING WAVELENGTH-SELECTIVE PLATE AND METHOD FOR PRODUCING SAME

BACKGROUND OF THE INVENTION

The present invention relates to a method for producing a radio wave-transmitting wavelength-selective plate that can efficiently transmit radio waves and visible light rays arriving at window glasses of buildings, automobiles and the like and that exhibits a sufficient heat insulation by reflecting heat rays of the sun.

In recent years, window glasses covered with conductive thin films or window glasses having films coated with conductive thin films have begun to prevail, for the purpose of shielding solar radiation.

The application of such window glasses to high buildings reflects radio waves of TV frequency band and causes the occurrence of ghost on the TV screen. Furthermore, it becomes difficult to receive satellite broadcast using an indoor antenna.

Furthermore, in case that they were used as residential window glasses or automotive window glasses, the communication with mobile phones was likely to become difficult, and it became a cause to lower the gain of an indoor antenna or glass antenna formed on vehicular window glass.

Under such condition, it is now conducted to coat a glass substrate with a transparent heat ray reflecting film of a relatively high electric resistance to transmit a part of the visible light rays and to reduce the radio wave reflection to prevent radio interference.

For example, in the case of a glass with a conductive film, it is known to prevent radio interference by partitioning the conductive film coated on a glass substrate such that the length of the conductive film that is parallel with the field direction of the incident radio wave is made to be 1/20 or less times the radio wave wavelength (see Japanese Patent No. 2620456).

Although the above method of coating thereon a transparent heat ray reflecting film of a relatively high electric resistance can prevent radio interference by reducing the radio wave reflection, the heat ray shielding performance was not sufficient, and it was problematic in terms of the life amenity.

Furthermore, a method of partitioning a conductive film is disclosed in Japanese Patent Laid-open Publication 2000-281388. Since the partition length is much longer than the wavelengths of the visible light and near infrared light occupying a most part of the sun light, all of these lights are reflected. Although there is obtained a radio-transmitting, wavelength-selective screen glass that prevents radio interference and has a sufficient solar radiation shielding performance, there is a problem of not being capable of maintaining the visible light transmission. Furthermore, in a large window having an opening size of 2 m×3 m, for example, it is necessary to cut a conductive film to 1/20 of the wavelength (about 25 mm) of satellite broadcast, at least to 1.25 mm squares, preferably 0.5 mm squares, in order to transmit satellite broadcast waves. It is necessary to take a long time to cut a large-area conductive film into such small segments by means of, for example, an yttrium-aluminum-garnet laser. Thus, it had problems such as being unrealistic.

Thus, the present inventors and others proposed a radio wave-transmitting, wavelength-selective plate in which fine particles composed of Ag are formed on a transparent substrate (see Japanese Patent Laid-open Publication 2000-281388).

There was a trouble that spectral reflectance becomes low in the entire wavelength region by shifting a wavelength (hereinafter abbreviated as resonance wavelength) at which spectral reflectance reaches a maximum to a range of 700 nm to 1500 nm, in a radio wave-transmitting, wavelength-selective glass in which granular Ag is formed on a transparent substrate, in order to increase a near infrared shielding coefficient (Es) defined in the formula (1), as disclosed in Japanese Patent Laid-open Publication 2000-281388.

SUMMARY OF THE INVENTION

It is an object of the present invention to provide a radio wave-transmitting, wavelength-selective plate that reduces reflectance to radio waves of respective frequency bands of TV broadcast, satellite broadcast and mobile phone, that has sufficient solar radiation shielding performance and visible light transmission, and that is preferable as automotive window glass and architectural window glass.

In a radio wave-transmitting, wavelength-selective plate where Ag is laminated on a transparent substrate, a radio wave-transmitting, wavelength-selective plate of the present invention is a radio wave-transmitting, wavelength-selective plate, which is characterized in that a layer composed of Ag fine particles is formed and that a Ag alloy formed of Ag and a homogeneous solid solution metal is contained in the central portion of the Ag fine particles.

DETAILED DESCRIPTION

According to the present invention, it is possible to provide a radio wave-transmitting, wavelength-selective plate that reduces reflectance to radio waves of respective frequency bands of TV broadcast, satellite broadcast and mobile phone, that has sufficient solar radiation shielding performance and visible light transmission, and that is preferable as automotive window glass and architectural window glass.

As a transparent substrate used in the present invention, it is possible to use a glass substrate, transparent ceramic substrate, heat-resistant, transparent plastic substrate or the like. In the case of using a radio wave-transmitting, wavelength-selective plate of the present invention for architecture and vehicular opening, glass substrate is desirable. Depending on the place for use or the like, it is preferable to select glass substrate, transparent ceramic substrate, heat-resistant transparent plastic substrate, or the like.

Figure 2:
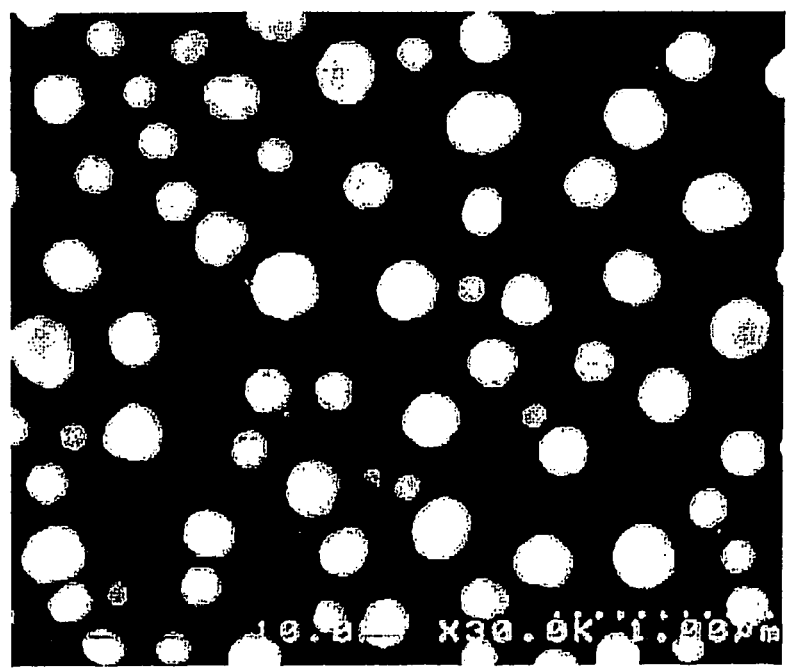
FIG. 2 is a SEM image of a granular Ag alloy formed on a transparent substrate.

A mixed film (hereinafter referred to as Ag mixed film) composed of Ag and a homogeneous solid solution metal is formed on a transparent substrate. By heating the Ag mixed film, a granular Ag alloy of a predetermined number is formed on the transparent substrate by a two-dimensional dispersion. FIG. 2 is a photograph (hereinafter referred to as SEM image) by the observation of a granular Ag alloy prepared in Example with a field emission type scanning electron microscope (FE-SEM).

Figure 1:
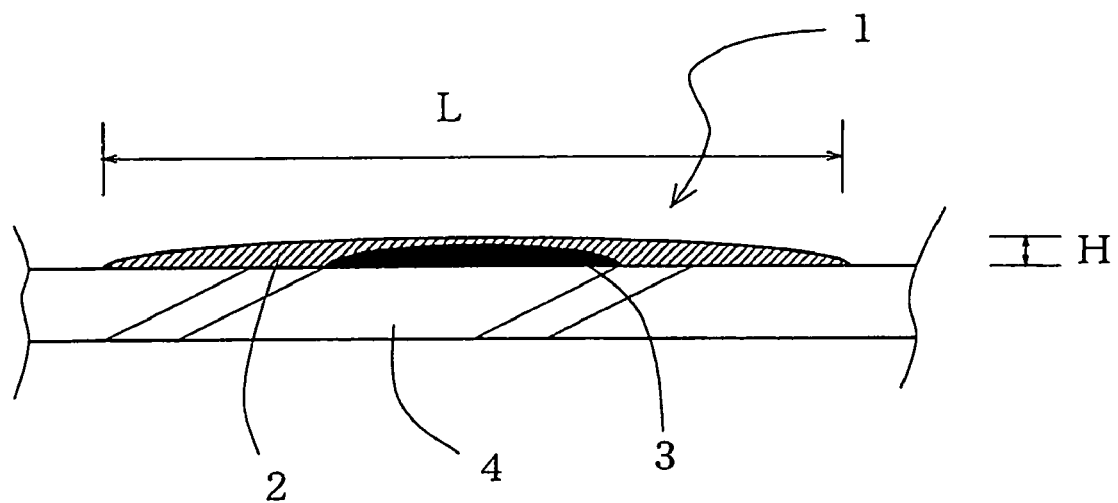
FIG. 1 is a sectional view schematically showing the Ag fine particle structure.

Furthermore, an Ag film composed of only Ag is laminated on the transparent substrate having the granular Ag alloy formed thereon. After laminating the Ag film on the granular Ag alloy, a second heating treatment is conducted to form a portion composed of only Ag on the surface and the surrounding of the granular Ag alloy and to form Ag fine particles of which central portion is composed of Ag and the homogeneous solid solution metal. FIG. 1 schematically shows Ag fine particles 1 formed on transparent substrate 4. Central portion 3 of Ag fine particles 1 is composed of an alloy of Ag and a homogeneous solid solution metal, and its surrounding is composed of only Ag.

The shape of the Ag fine particles is hemispherical, of a string of domes, flat, flake-like or needle-like or the like, as well as dome-like shown in FIG. 1. In view of optical performance, the shape is preferably hemispherical, dome-like, flat or flake-like.

The present invention makes it easy to control the Ag fine particle shape shown in FIG. 1. As a result, a radio wave-transmitting, wavelength-selective plate of the present invention can shift resonance wavelength to a range of 700 nm-1500 nm of a large near infrared ray shielding coefficient, thereby obtaining a radio wave-transmitting, wavelength-selective plate having superior heat insulation.

It is preferable that the number of the Ag alloy granules per unit area is controlled by the film thickness of the Ag mixed film. Furthermore, it is preferable that the particle diameter of the Ag fine particles is controlled by the film thickness of the Ag film that is laminated on the granular Ag alloy.

As the homogeneous solid solution metal, it is possible to use Pd, Au and the like. By adding a metal having a melting point higher than Ag as the homogeneous solid solution metal, it becomes possible to reduce a rate at which Ag fine particles are formed.

At the second heating, the granular Ag alloy of the central portion acts as a nucleus, and it is possible to adjust the rate at which the Ag fine particles are formed, by the difference in travel speed between Ag and the homogeneous solid solution metal and by the amount of the homogeneous solid solution metal added. Therefore, it is desirable to use one having a melting point higher than that of Ag, as the homogeneous solid solution metal. Furthermore, it is desirable to select a homogeneous solid solution metal having an atomic weight greater than that of Ag, since it brings about an effect of reducing the rate at which the Ag fine particles are formed and since it becomes easy to control the shape (particle diameter L and height H of FIG. 1) of the Ag fine particles.

In the case of selecting a homogeneous solid solution metal having a melting point higher than that of Ag, it is necessary to form the Ag fine particles by a heating lower than softening point of the transparent substrate. Therefore, there is an upper limit of the amount of the homogeneous solid solution metal added.

That is, in general, in case that meting point of metal is expressed by absolute temperature, the metal on the transparent substrate starts diffusion on the transparent substrate surface at a temperature that is 0.3 times the melting point. Therefore, in case that melting point of the homogeneous solid solution metal is higher than that of Ag, it is possible to add the homogeneous solid solution metal until a value that is 0.3 times the melting point of the Ag alloy becomes equal to the softening point of the transparent substrate.

A preferable particle height H of the Ag fine particles is 10 nm to 500 nm, but it is not limited to these. The particle diameter L of the Ag particles is preferably a size of 100 nm to 0.5 mm.

The film thicknesses of the Ag mixed film and the Ag film are preferably in a range of 5 nm to 1 µm. If they are less than 5 nm, the Ag film turns to have an island-like shape and is not formed uniformly. Thus, it is not preferable. If it exceeds 1am, it becomes difficult to form a granular shape at a heating temperature lower than softening point of the transparent substrate. Thus, it is not preferable.

The method of forming the Ag mixed film and the Ag film is not particularly limited. It is possible to use a film forming method such as sputtering, vacuum deposition, CVD method, and ion plating. In particular, DC magnetron sputtering is preferable from the points of homogeneity of the formed layer and productivity. It is possible to form the Ag mixed film by using a means of adding a homogeneous solid solution metal in the chip form to an Ag target member or by using a target composed of an alloy of Ag and homogeneous solid solution metal.

The method of heating the Ag mixed film and the Ag film can be conducted by a method such as resistance heating, gas burning heating, laser or electron beam irradiation, or induction heating In the case of using a heat resistant, transparent plastic as the transparent substrate, a heating by a laser beam that is almost not absorbed by the transparent substrate and an induction heating that can selectively heat only the conductive material are preferable heating methods.

Regarding the heating condition, it is preferable that the heating temperature is 150° C. or higher and a temperature, at which the transparent substrate does not soften, or lower.

In the case of heating the transparent substrate formed with the Ag mixed film and the Ag film, for example, in a heating furnace, 150° C. or higher is preferable in order to form the granular Ag alloy and the Ag fine particles in several hours.

If the temperature of the transparent substrate exceeds softening point, particularly in the case of using an oxide glass for the transparent substrate, Ag atoms diffuse in the transparent substrate. With this, wavelength selectivity by the reflection of electromagnetic waves lowers extremely.

In case that the Ag film or Ag mixed film is subjected to an irradiation with a beam such as laser or electron beam or to induction heating, it is possible to selectively heat the Ag film or Ag mixed film without heating the transparent substrate. Therefore, the upper limit of the heating temperature can be set to the boiling point of Ag, 2212° C.

The heating time is preferably from several seconds to several hours in the case of resistance heating and gas burning heating and from microseconds to several seconds in the case of beam irradiation such as laser or electron beam or induction heating. After the heating, it may be cooled down by self-cooling or compulsory cooling such as air blowing.

Plasma frequency, at which extinction coefficient of Ag becomes infinitesimal, resides in a wavelength range of the ultraviolet region that is close to the visible light region. Therefore, transparency of visible light rays can be ensured by controlling the thickness of the Ag particles and the thickness of the dielectric layer film.

Furthermore, a radio wave-transmitting, wavelength-selective plate of the present invention controls the particle diameter L, the number, distribution and the like of the Ag fine particles by the thickness of the Ag mixed film, the thickness of the Ag film and the heating condition and selectively reflects near infrared rays. The number may be taken as occupancy a real ratio of the substrate surface, relative to the particle diameter L.

In order to selectively reflect near infrared rays, it is preferable that the near infrared shielding coefficient (Es) defined in the following formula (1) is 0.3 or greater. To make it 0.3 or greater, it is preferable to control the number of the Ag alloy granules and the particle diameter of the Ag fine particles such that the maximum value of the spectral reflectance of the radio wave-transmitting wavelength-selective plate is in a wavelength range of 600 nm to 1500 nm, to adjust the particle diameter L of the Ag fine particles to 100 nm to 0.5 mm, and to adjust the occupancy a real ratio to 0.2-0.8.

$$E_s = \frac{\sum_{\lambda=680}^{1800}[R_{dp}(\lambda)I_{sr}(\lambda)]}{\sum_{\lambda=680}^{1800}[I_{sr}(\lambda)]} \quad (1)$$

where $\lambda$ is a wavelength of an electromagnetic wave incident on the film surface, $R_{dp}$ is a reflectance of the film surface at the wavelength $\lambda$, and $I_{sr}$ is an intensity of solar radiation at the wavelength $\lambda$ when an air-mass is 1.5.

If the occupancy a real ratio of the Ag fine particles is less than 0.2, the average distance between the Ag particles becomes two times the particle diameter or greater. With this, the mutual interference between the particles becomes small, and it is not possible to obtain a radio wave-transmitting, wavelength-selective plate having an effective near infrared shielding coefficient. In case that the particle diameter of the Ag fine particles is less than 100 nm, the maximum value of the spectral reflectance turns to be 600 nm or less.

If the occupancy a real ratio exceeds 0.8, almost the Ag fine particles turn to be in a cluster form, thereby loosing the wavelength-selective function to transmit radio waves. Even in case that the particle diameter L of the Ag fine particles exceeds 0.5 mm, the wavelength-selective function to transmit radio waves is lost.

It is possible to determine the occupancy a real ratio of the Ag fine particles, for example, by an observation with a field emission type scanning electron microscope (FE-SEM) in the direction of normal line of the transparent substrate to obtain an SEM image, then by subjecting the SEM image to a binarization through an image processing of the Ag fine particles and the surface of the transparent substrate on which the Ag fine particles are not present, and then by dividing the total area of the Ag fine particles by the total area of the SEM image.

The particle diameter L of the Ag fine particles may be obtained by determining the number of the Ag fine particles by an image obtained by the binarization of the SEM image and then by dividing the total area of the Ag fine particles by that number. The obtained area may be defined as being of a circle of the same area, and the diameter of the circle may be defined as the particle diameter of the Ag fine particles.

Therefore, for example, in case that the Ag fine particles are in a dome-like shape, the particle diameter L corresponds to the diameter of the bottom surface of the dome.

In a radio wave-transmitting, wavelength-selective plate of the present invention, it is preferable to form a dielectric layer as an underlayer and/or top layer of the Ag fine particles.

In case that a dielectric layer is formed as an underlayer of the Ag fine particles, the Ag mixed film is formed after forming the dielectric layer on the transparent substrate surface.

In case that a dielectric layer is formed as a top layer of the Ag fine particles, the dielectric layer is formed on the Ag fine particles after forming the Ag fine particles.

As the dielectric layer, it is possible to use a nitride of either metal of Al, Si, Ti, Ta, Ge, In, W, V, Mn, Cr, Ni and stainless steel; an oxide of either metal of Al, Si, Zn, Sn, Ti, Ta, Ge, In, W, V, Mn, Cr, Ni and stainless steel, or a laminate of these.

In particular, since nitrides of metals of Al and Si and oxides of metals of Al, Si, Zn, Sn, Ti, Ta and In are colorless and transparent, they are suitable for architectural and vehicular window glasses that demand a radio wave-transmitting, wavelength-selective plate having a high visible light transmittance.

If the Ag fine particles are coated with a dielectric layer, the visible light transmittance is increased by an interaction with a dielectric layer formed on the transparent substrate, and it acts as a protective film for the deterioration prevention of the Ag granular layer and the like. Thus, it is more preferable. As a dielectric layer used in this case, nitrides of Al and Si, oxides of Al, Si, Zn, Sn, Ti, Ta and In, or laminates of these are desirable.

As a method for forming the dielectric layer, sputtering, vacuum deposition, CVD method, ion plating and the like are used. In particular, DC magnetron sputtering is more preferable from the points of homogeneity and productivity of the formed layer.

In the following, examples of the present invention are described. The present invention is not limited to these.

EXAMPLE 1

A radio wave-transmitting, wavelength-selective plate of the present invention was produced by the following procedure. A float glass plate was used as the transparent substrate.

1) Firstly, a washed float glass plate of a thickness of 3 mm was put into a DC magnetron sputtering apparatus, followed by exhaust until the degree of vacuum reaches $2 \times 10^{-4}$ Pa to $4 \times 10^{-4}$ Pa. The distance between the target and the glass substrate was set to 90 mm.

2) Then, four of Pd chips (rectangular parallelopiped of 10 mm×10 mm×1 mm) were equidistantly placed on an erosion region of an Ag target (diameter: 152 mm; thickness: 5 mm). An electric power of DC 30 W was applied to this target to make it discharge, thereby forming an Ag—Pd mixed film of a film thickness of 13 nm. During the film formation, the pressure of Ar gas was controlled to 1 Pa.

3) Then, the transparent substrate having thereon the Ag mixed film was heated for 5 min in a thermostatic oven of an ambient temperature of 500° C. Then, it was taken out of the oven for self-cooling, thereby forming a granular Ag alloy on the surface of the transparent substrate.

4) Then, an electric power of DC 30 W was applied to the Ag target (diameter: 152 mm; thickness: 5 mm) to make it discharge, thereby laminating an Ag film of a film thickness of 13 nm on the granular Ag alloy. Ar gas (pressure: 1 Pa) was used as the atmosphere during the film formation.

5) Then, that with the Ag film laminated thereon was heated for 5 min in a thermostatic oven of an ambient temperature of 450° C. Then, it was taken out of the oven for self-cooling, thereby forming Ag fine particles on the glass surface of the substrate.

6) Then, the steps of 4) and 5) were further repeated two times, thereby increasing the particle diameter L and the height H of the Ag fine particles.

Spectral reflectance and spectral transmittance of the thus obtained radio wave-transmitting, wavelength-selective plate were measured in a wavelength range of 300-2500 nm using U-4000 type automated spectrophotometer made by Hitachi Ltd. Furthermore, the measured value was substituted in the formula (1), thereby determining the near infrared shielding coefficient. The results are shown in Table 1.

As a result, there was obtained a good wavelength-selective plate having a large near-infrared shielding coefficient of 0.51 at a resonance wavelength of 720 nm and a visible light transmittance of 15%.

EXAMPLE 2

A radio wave-transmitting, wavelength-selective plate was prepared by forming Ag fine particles on the transparent substrate surface by repeating Example 1, except in that the operations of 4) and 5) of Example 1 were repeated five times. As a radio wave-transmitting, wavelength-selective plate of the present example, there was obtained a good wavelength-selective plate having a very large value of 0.61 in near infrared shielding coefficient at a resonance wavelength of 900 nm and a slightly decreased visible light transmittance of 13%.

Comparative Example 1

In the present comparative example, fine particles composed of only Ag were formed on a transparent substrate by the following procedures using the same float glass plate as that of Examples 1 and 2.

1) Firstly, a washed float glass plate of a thickness of 3 mm was put into a DC magnetron sputtering apparatus, followed by exhaust until the degree of vacuum reaches $2 \times 10^{-4}$ Pa to $4 \times 10^{-4}$ Pa. The distance between the target and the glass substrate was set to 90 mm.
2) Then, an electric power of DC 30 W was applied to the Ag target (diameter: 152 mm; thickness: 5 mm) to make it discharge, thereby forming an Ag film of a film thickness of 25 nm. During the film formation, the pressure of Ar gas was controlled to 1 Pa.
3) Then, the transparent substrate with the Ag film formed thereon was heated for 5 min in a thermostatic oven of an ambient temperature of 500° C. Then, it was taken out of the oven for self-cooling, thereby forming granular Ag on the surface of the transparent substrate.

Spectral reflectance and spectral transmittance of the thus obtained one were measured in a wavelength range of 300-2500 nm using U-4000 type automated spectrophotometer made by Hitachi Ltd. Furthermore, the measured value was substituted in the formula (1), thereby determining the near infrared shielding coefficient. The results are shown in Table 1.

In the product of Comparative Example 1, the resonance wavelength shifted from the visible region to 900 nm, and the visible light transmittance increased to 52%. However, the near infrared shielding coefficient was as small as 0.3, and one having a high near-infrared shielding coefficient was not obtained.

TABLE 1

| | Occupancy Area Ratio | Resonance Wavelength (nm) | Near Infrared Shielding Coef. | Visible Light Transmittance (%) |
|---|---|---|---|---|
| Ex. 1 | 0.47 | 720 | 0.51 | 15 |
| Ex. 2 | 0.57 | 900 | 0.61 | 13 |
| Com. Ex. 1 | 0.25 | 900 | 0.30 | 52 |

As shown in Table 1, there were obtained in Examples 1 and 2 ones having high near infrared shielding coefficients by shifting the resonance wavelengths to a range of 700 nm to 1500 nm. In contrast, in the case of Comparative Example 1, one having a high near-infrared shielding coefficient was not obtained.

The invention claimed is:

1. A radio wave-transmitting, wavelength-selective plate having Ag laminated on a transparent substrate, characterized in that a layer wherein Ag fine particles are dispersed by a heat treatment is formed, that a central portion of the Ag fine particles contains an alloy (hereinafter referred to as Ag alloy) formed of Ag and a metal forming a homogeneous solid solution (hereinafter referred to as homogeneous solid solution metal) with Ag, and that an outer layer of the Ag fine particles covers the central portion and contains only silver.

2. A radio wave-transmitting, wavelength-selective plate according to claim 1, characterized in that a value obtained by multiplying the highest temperature of melting point of the Ag in absolute temperature and melting point of the Ag alloy in absolute temperature by 0.3 is lower than softening point of the transparent substrate in absolute temperature.

3. A radio wave-transmitting, wavelength-selective plate according to claim 1, characterized in that average particle diameter L of the Ag fine particles is 100 nm to 0.5 mm and that a proportion of an area ecivered with the Ag fine particles on a surface of the transparent substrate is in a range of 0.2 to 0.8.

4. A radio wave-transmitting, wavelength-selective plate according to claim 1, characterized in that the maximum value of light ray reflectance is in a wavelength range of 600 nm to 1500 nm.

5. A radio wave-transmitting, wavelength-selective plate according to claim 1, characterized in that a dielectric layer is formed as an underlayer and/or top layer of a layer composed of the Ag fine particles.

6. A radio wave-transmitting, wavelength-selective plate according to claim 1, characterized in that an electromagnetic wave is incident on a surface on which a layer composed of the Ag fine particles is formed and that a near infrared shielding coefficient (Es) defined in the formula (1) is 0.3 or greater, $$E_s = \frac{\sum_{\lambda=680}^{1800} [R_{dp}(\lambda) I_{sr}(\lambda)]}{\sum_{\lambda=680}^{1800} [I_{sr}(\lambda)]} \qquad (1)$$

where λ is a wavelength of an electromagnetic wave incident on the film surface, $R_{dp}$ is a reflectance of the film surface at the wavelength λ, and $I_{sr}$ is an intensity of solar radiation at the wavelength λ when an air-mass is 1.5.

7. A method for producing a radio wave-transmitting, wavelength-selective plate according to claim 1, characterized in that a mixed film, in which the Ag and the homogeneous solid solution metal are mixed together, is formed on a transparent substrate, followed by a heat treatment of the mixed film, thereby forming central portions of the Ag fine particles on the transparent substrate, and that an Ag layer is laminated on the central portions on the surface of the transparent substrate, followed by a heating treatment, thereby forming each Ag fine particle in which the central portion is surrounded by an outer layer containing only silver.

8. A method for producing a radio wave-transmitting, wavelength-selective plate according to claim 7, characterized in that the number of the Ag fine particles per unit area is controlled by a film thickness of Ag and/or a film thickness of a metal forming a homogeneous solid solution and/or a film thickness of the mixed film.

9. A method for producing a radio wave-transmitting, wavelength-selective plate according to claim 7, characterized in that a particle diameter and an occupancy areal ratio of the Ag fine particles are controlled by the film thickness of the Ag layer and/or the number of the lamination of the Ag layer.

10. A method for producing a radio wave-transmitting, wavelength-selective plate according to claim 7, characterized in that at least one method selected from resistance heating, gas burning heating, laser irradiation, electron beam irradiation and induction heating is used as a heating method in the heating treatment.

11. A method for producing a radio wave-transmitting, wavelength-selective plate according to claim 7, characterized in that temperature of the transparent substrate in the heating treatment is 150° C. or higher and is lower than softening point of the transparent substrate.

12. A method for producing a radio wave-transmitting, wavelength-selective plate according to claim 7, characterized in that the mixed film, in which Ag and the homogeneous solid solution metal are mixed together, and the Ag film are formed by a DC magnetron sputtering.

13. A method for producing a radio wave-transmitting, wavelength-selective plate according to claim 5, characterized in that the dielectric layer is formed by a DC magnetron sputtering.

* * * * *